INVENTOR
Roy W. Pearson
BY Francis J. Kleupas
ATTORNEY

Oct. 14, 1958  R. W. PEARSON  2,856,511
INDEXING APPARATUS FOR STITCH WELDERS AND THE LIKE
Filed March 12, 1957  3 Sheets-Sheet 2

INVENTOR
Roy W. Pearson
BY Francis J. Kempf
ATTORNEY

Oct. 14, 1958 R. W. PEARSON 2,856,511
INDEXING APPARATUS FOR STITCH WELDERS AND THE LIKE
Filed March 12, 1957 3 Sheets-Sheet 3

INVENTOR
Roy W. Pearson
BY Francis J. Klempay
ATTORNEY

United States Patent Office 2,856,511
Patented Oct. 14, 1958

2,856,511
INDEXING APPARATUS FOR STITCH WELDERS AND THE LIKE

Roy W. Pearson, Warren, Ohio, assignor to The Taylor-Winfield Corporation, Warren, Ohio, a corporation of Ohio Application March 12, 1957, Serial No. 645,432

28 Claims. (Cl. 219—87)

The present invention relates to new and novel indexing apparatus and more particularly to such apparatus adapted for use with stitch welders.

Generally speaking, prior art stitch welding apparatus has been limited to producing circular patterns of spaced or overlapped spot welds wherein the radius of the circular pattern of welds is adjustable. However, in the co-pending patent application of Melvin M. Seeloff and Alfonce F. Keyser, Serial No. 593,976, filed June 26, 1955, entitled "Stitch Welding Apparatus" which is assigned to the assignee of the present invention there is disclosed and claimed a stitch welder of an improved type for completing any preselected pattern of overlapped or spaced spot welds. For example, circular, elliptical and other shaped patterns of any predetermined size are obtainable with this apparatus. As is apparent from study of this above mentioned patent application, a movable electrode is attached to a slide which is slidably mounted in a way at the bottom of a generally T-shaped spindle. This spindle is journaled in a housing and intermittently rotated by a fluid cylinder acting through an over-running clutch. The slide, and consequently the movable electrode, is moved in the way normally with respect to the axis of the spindle by cam means as the spindle is rotated.

In the previous application, the length of stroke of the indexing cylinder was controlled by adjustable stops on the piston rod or in the cylinder and therefore the amount of indexing movement or the angular distance traveled by the spindle remained constant for any setting of the stops each time the cylinder was actuated to drive the spindle. When a circular pattern of welds was desired the spacing between the centers of adjacent individual welds remained constant. However, when some other shaped pattern was being welded the distances between adjacent welds at different points of the pattern were not equal. This was, of course, due to the fact that the off-center distance or radius of the movable electrode with respect to the axis of the spindle changed for different portions of the pattern and the arc distance that the movable electrode moved was dependent upon the radius and the amount of angular movement of the spindle. Although in some installations this difference in the spacing of the welds is not undesirable, in others it is necessary to maintain the spacing constant and in some operations it is required that the spacing of the welds be unequal in accordance with a preselected and predetermined spacing.

It is therefore the primary or ultimate object of the present invention to provide indexing apparatus for stitch welders and the like wherein the incremental movements of the movable member, as for example a welding electrode, moving in any predetermined pattern may be infinitely varied. This object also contemplates the special case wherein the incremental movements of the movable member moving in a non-circular path are equal and uniform.

Yet a further object of the invention is to provide apparatus of the character described wherein the spacing between successive welds may be accurately and precisely controlled to obtain overlapped or spaced spot welds depending upon the type of weld desired for any given welding operation.

Another object of the present invention is to provide new and novel mechanical means for carrying out the objects enumerated above. As will be hereinafter more fully apparent, use is made of a linkage mechanism having low frictional characteristics and cam means operative through this linkage mechanism to control the actuation of the indexing cylinder.

A more specific object of the invention is to provide apparatus of the character described of rugged and simplified construction whereby the same is easily manufactured and assembled but yet is adapted for continuous and sustained operation.

Although the new and novel indexing apparatus will be explained in connection with and is particularly useful when employed with a stitch welder assembly, it will be apparent to those skilled in the arts that this apparatus may be advantageously employed whenever it is necessary or desirable to control the movement of an indexed member in the manner set forth.

These objects, as well as other objects and advantages of the invention, will become apparent upon consideration of the following detailed specification and accompanying drawing wherein there is described and shown a preferred embodiment of the invention.

Figures 1, 6:
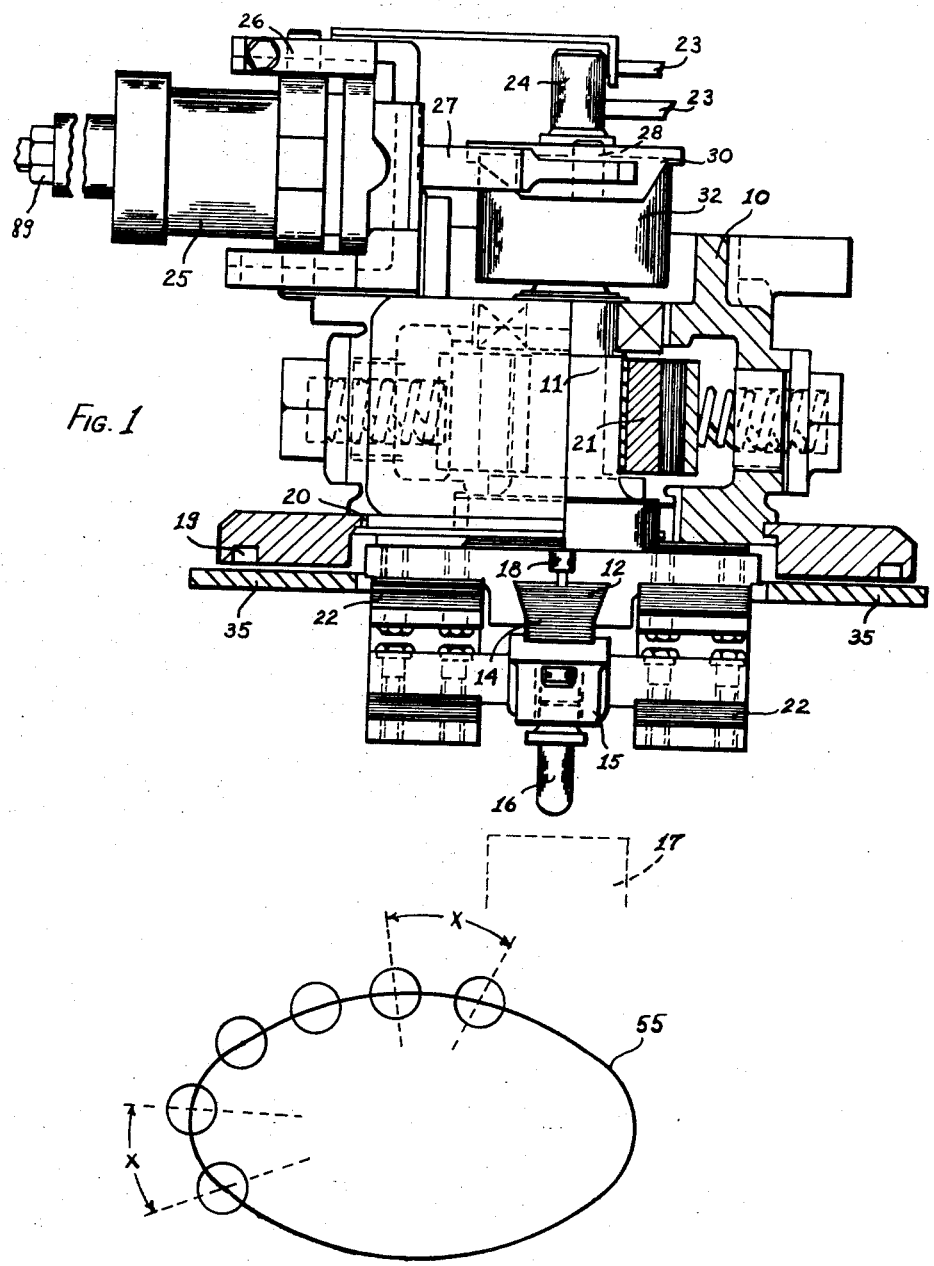
Figure 1 is a front view, partially in section, of stitch welding apparatus embodying indexing apparatus of the present invention.
Figure 6 is a schematic plan view of a pattern of spot welds which may be obtained with the apparatus of the present invention.

Referring now to the drawing, and initially to Figure 1 thereof, there is shown a front elevational view of a stitch welder head having a main housing 10 of the configuration shown which is adapted to be attached to the end of a welding ram, not shown, and vertically moved by a welding ram fluid cylinder, also not shown. Journaled in the housing 10 by various bearings, not specifically shown, is a T-shaped spindle 11 having a way 12 in the bottom face thereof. Slidably mounted in this way is an insulated slide 14 which mounts a welding electrode carrier 15. The carrier 15 carries a movable and downwardly depending electrode 16 which is adapted to cooperate with a stationary electrode block 17 for the completion of welding operations. The insulated slide 14 also mounts on the forward end thereof a cam follower roller 18 which is adapted to ride around a cam 19 having a predetermined contour when the spindle is rotated thereby determining the shape and size of the weld pattern. The cam 19 is rigidly attached to the main housing 10 by an interlocking fit as at 20 whereby this member does not and cannot rotate.

Electrical current is transferred to the spindle through a pair of oppositely disposed spring-loaded current conducting shoes 21 which engage the spindle intermediate its ends and from the spindle to the electrode carrier 15 via a pair of U-shaped flexible band conductors 22. Coolant is circulated throughout the stitch welder head through various passageways and conduits, not specifically shown, from conduits 23 leading to a rotary fluid fixture 24 in a well known and conventional manner.

Figure 5:
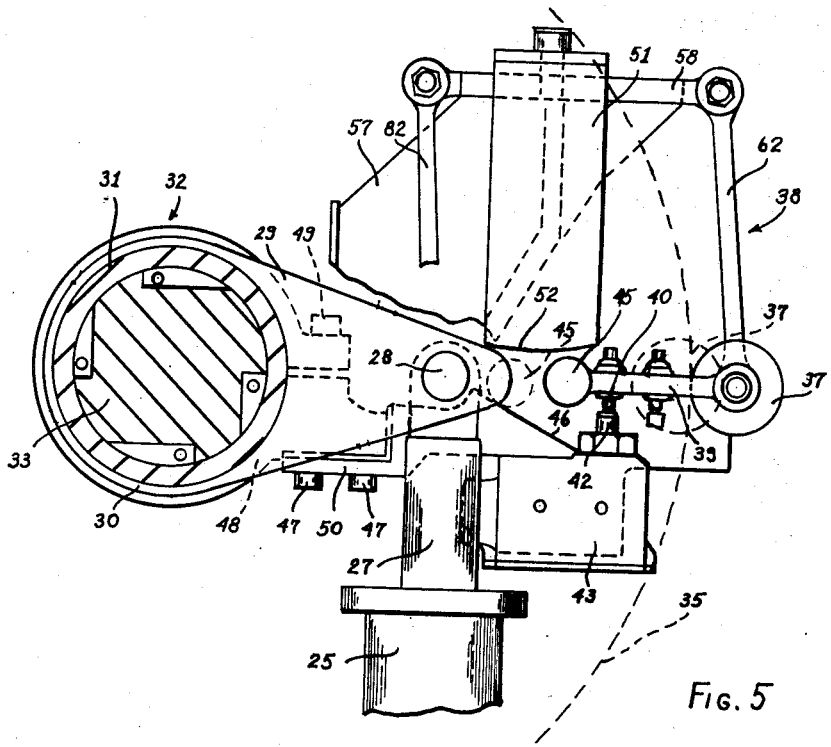
Figure 5 is a fragmentary plan view of the indexing apparatus with the alternate operative position of some of the component parts thereof shown in broken lines.

In accordance with the teachings of the above identified patent application the spindle 11 is adapted to be rotated by fluid cylinder 25 mounted by a mounting clevis 26 extending from the main housing. The piston rod 27 of this cylinder is pivotally attached by a pin 28 to arm 29 carrying an integral cap fitting 30 which is secured to an outer race 31 of an over-running clutch 32. The over-running clutch 32 is of the multiple-roller or Sprague type well known in the art and which is shown in detail in Figure 5 of the drawing to comprise an inner member 33 keyed to the spindle 11 and the outer race 31 whose flanges revolve freely around spindle 11 outwardly of the inner member 33. The arrangement is such that spindle 11 will be rotated upon actuation of index cylinder 25 in one direction but will not rotate as the cylinder piston rod is returned to its original position due to the over-running nature of the clutch.

Thus, upon proper and continued actuation of the index cylinder 25 the spindle will be intermittently rotated with the electrode 16 moving in a pattern dependent upon the shape of cam 19.

As set forth above, it is the object of this invention to provide means for accurately and precisely controlling the actuation of the indexing cylinder 25 whereby the spacing between the centers of adjacent welds is accurately regulated in accordance with a predetermined pattern. For accomplishing this end an annular or slotted camming plate 35 is attached in insulated relation with respect to the enlarged head portion of the T-shaped spindle 11 in the manner shown in Figure 1 of the drawing. This camming plate, unlike cam 19, is adapted to rotate with the spindle 11 upon proper actuation of the index cylinder 25 and, of course, does not in any manner interfere with the downwardly depending slide 14, electrode carrier 15, movable electrode 16 or any appurtenant apparatus carried thereby. The camming plate 35 has a predetermined outer periphery, the shape of which is selected in accordance with principles to be hereinafter more fully explained, and is engaged by cam follower roller 37 which is interconnected by linkage means 38 to a pivoted actuating arm 39. This actuating arm mounts intermediate its ends an operating pin 40 which is adapted to engage and depress an operator 42 of micro-switch 43. Micro-switches are well known in the arts and this particular one is connected in such a manner that when the operator 42 is depressed the index cylinder 25 is actuated to drive the spindle 11 through the over-running clutch 32. When the operator 42 is released the internal connections in the switch are such to reverse the actuation of the index cylinder thus returning the piston rod thereof to its original position although the spindle does not rotate during this portion of the cycle because of the over-running nature of clutch 32. When the piston rod of the cylinder has reached its original position the index cylinder is again actuated to rotate the spindle 11.

Mounted on the rear end of the pivoted actuating arm 39 is a cam follower roller 45 which is adapted to be engaged at various times by a cammed surface 46 of a cam fixture 50. This cam fixture is replaceably mounted by bolts 47 on a split annular clamping fixture 48 held in tight circumscribing relation with respect to the outer race 31 of the over-running clutch 32 by means of a clamping bolt 49. It will be noted in Figure 5 that this fixture is mounted on the outer race of the over-running clutch whereby it, and consequently the camming fixture 50 carried thereby, are tied directly to the index cylinder and are reciprocably rotated upon each complete cycle of operation of the index cylinder.

Thus, as the cylinder is actuated to rotate the spindle the camming fixture 50 will rotate until the cammed surface 46 strikes the cam follower roller 45 thereby pivoting the actuating arm 39 to actuate the micro-switch operator 42. A stop plate 51 is mounted to one side of the cam follower roller 45 and is adapted to positively prevent any "over travel" of the index cylinder 25. This stop plate 51 has an accurately contoured stopping surface 52 so that only the desired rotation is imparted to the spindle 11 for each cycle of operation of the indexing cylinder 25.

It will be readily apparent that if the cam follower roller 45 remains in the same position with respect to the camming fixture 50 the amount of angular rotation imparted to the spindle 11 will be equal for each cycle of operation of the indexing cylinder. This is not to say however that the distance between successive spot welds will necessarily remain constant since the arc distance traveled by the movable electrode depends upon the product of amount of angular movement of the spindle and the radius (the off-center distance of the movable electrode with respect to the axis of the spindle) which will change in accordance with the shape of cam 19. If the cam follower roller 45 moves longitudinally with respect to the camming fixture 50, such as, for example, if it moves to the broken line position shown in Figure 5, the amount of rotation of the camming fixture 50 necessary to pivot the actuating arm 39 is much less than that required when the cam follower roller 45 was in the original position and therefore the angular rotative movement of the spindle 11 will be much less.

As will be apparent, the positioning of the cam follower roller 45 is dependent upon the position of the cam follower roller 37 which in turn is dependent upon the shape of the camming plate 35. By contouring the camming plate 35 and the camming fixture 50 relative to each other any required or desired spacing of the spot welds may be obtained and this spacing is relatively independent of the shape of the cam 19. In Figure 6 there is shown the results obtained by a machine having the various camming surfaces shown in the other figures of the drawing. Cam 19 is operative to move the electrode 16 in an elliptical path 55 while the camming surface 46 and camming plate 35 keep the distance between adjacent welds, represented by indicia X, constant around the entire elliptical pattern. If no means were employed to control the spacing of spot welds the distance therebetween would vary as the radius of the pattern varied. Of course, as outlined above, any spacing of the welds, whether spaced or overlapped and/or constant or variable can be obtained by utilizing the proper camming plate and camming fixture.

Figure 4:
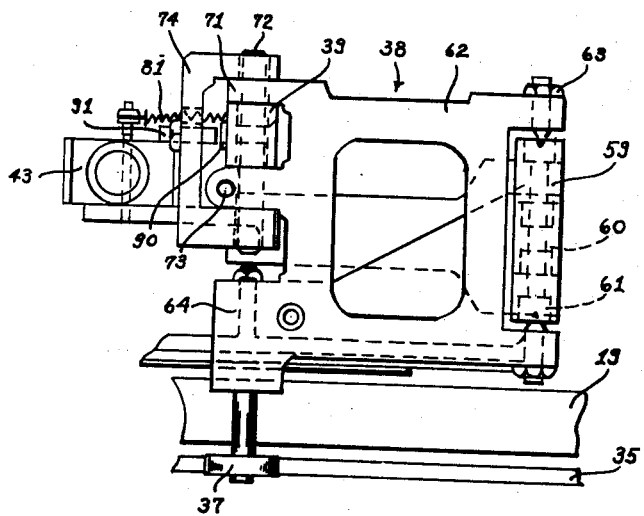
Figure 4 is a front elevational view of the apparatus shown in Figure 2 showing specifically the linkage mechanism employed.

Considering now the specific linkage means 38 employed in the present invention and the mounting of various component parts of the indexing apparatus already described, there is mounted on the main housing 10 by bolts 56 a forwardly extending and upwardly inclined mounting bracket 57 whose side edge forms a first and rigidly supported arm 58 of the linkage mechanism 38. The ends 59 and 60 of this first and rigidly supported arm are of different heights (see Figure 4) and are vertically apertured as at 61 whereby the same are adapted to form pivot points for the linkage mechanism. Pivoted on the end 59 is a second and movable arm 62 of the linkage having the configuration shown with the pivoting means being provided by the screws 63. The arm 62 has an enlarged boss 64 on the forward edge thereof which journals, by means of bearing 65, a shaft 66 mounting the cam follower roller 37 at its lower end. A tension spring 67 has one end thereof attached to the enlarged boss 64 while the other end terminates at a mounting stud 70 projecting from the mounting bracket 57. Thus, the second arm 62 of the linkage mechanism is spring biased in such a manner that the cam follower roller 37 is always urged against the camming plate 35.

The arm 62 is also provided with a pair of spaced lugs 71 at the upper forward edge thereof which are apertured and adapted to engage pivot pin 72 intermediate the ends thereof. The lower of these lugs is split and a tightening screw 73 is provided for clamping the same on the pivot pin 72. Pivotally mounted on the pivot pin 72 intermediate the lugs 71 is the forward end of the actuating arm 39 which mounts micro-switch operating pin 40 and cam follower roller 45. Also pivotally mounted on the pivot pin 72 are the legs of a generally U-shaped fitting 74 which embraces the lugs 71 and actuating arm 39 and has an integral but normally extending arm 75 that forms the third arm of the linkage mechanism.

The third arm 75 of the linkage mechanism extends in a direction generally parallel with the first arm 58 and its other end has an enlarged vertically apertured boss 77 which is pivotally received intermediate the ends of a pivot pin 78. Intermediate the pivot points the third arm carries a transversely extending and integral mounting platform 79 upon which is mounted the micro-switch 43. It is noted that the relative heighths of the third arm 75 and the actuating arm 39, which extend generally in the same direction, are such that the operating pin 40 is in line with the micro-switch operator 42. In order to keep these last mentioned members in contact except when the actuating arm is pivoted as hereinbefore explained a tension spring 81 has its ends interconnected with the micro-switch and the actuating arm thereby holding the pin against the operator.

Interconnecting the first rigidly supported arm 58 and the third arm 75 is a fourth arm 82 which extends generally parallel with respect to the second arm 62. At its forward end the fourth arm 82 has an apertured mounting clevis 83 which is pivotally received in the pivot pin 78 and the rear of this arm is pivotally supported by a pair of screws 84 at the end 60 of the first arm 58.

In effect the various arms described above form a parallelogram linkage wherein the first and third arms and the second and fourth arms are always parallel to each other. Since the first arm 58 is rigidly supported the third arm and the actuating arm which is generally parallel thereto but spaced vertically thereof will move in a straight line relation in response to movement of the cam follower roller 37 engaging the camming plate 35 under the influence of tension spring 67. This parallelogram type of linkage is excellently suited for the indexing apparatus because of its extremely low frictional characteristics. Other types of linkage means are within the purview of this invention, such as, for example, a slide mechanism. The main requirement is, irrespective of the type of linkage mechanism employed, that movement of the cam follower roller be faithfully transmitted to the cam follower roller 45.

Several other aspects of the indexing apparatus are also worthy of note. In order to insure approximate parallelism between the actuating arm 39 and the third arm of the linkage mechanism 75 a stop pin 86 is mounted on the actuating arm intermediate the operating pin 40 and the pivot pin 72. This stop pin 86 is adapted to bear against a vertically extending stop 87 mounted on the upper surface of mounting platform 79 carrying the micro-switch 43. The tension spring thus retains the actuating arm in general parallel relation with respect to the third arm until the cam follower roller 45 is engaged by the camming fixture 50.

Figure 2:
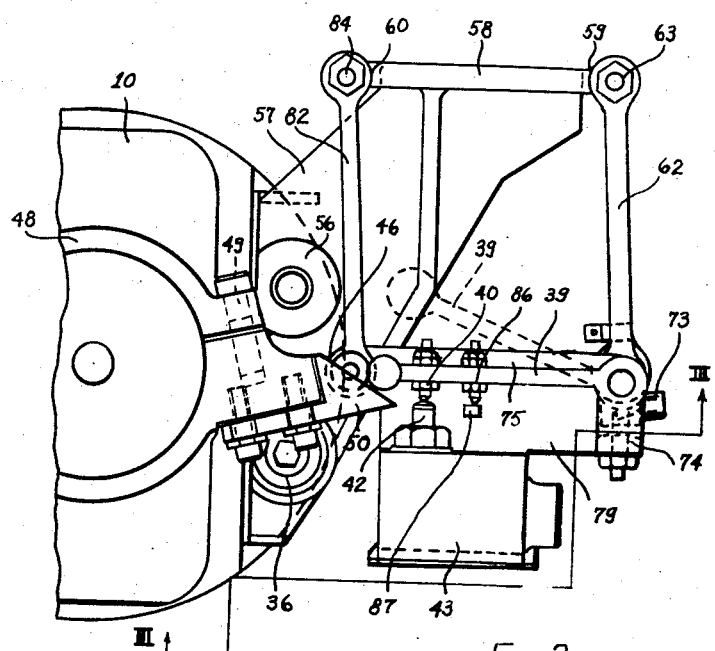
Figure 2 is a fragmentary plan view of indexing apparatus constructed in accordance with the teachings of the present invention as applied to a stitch welder.
Figure 3:
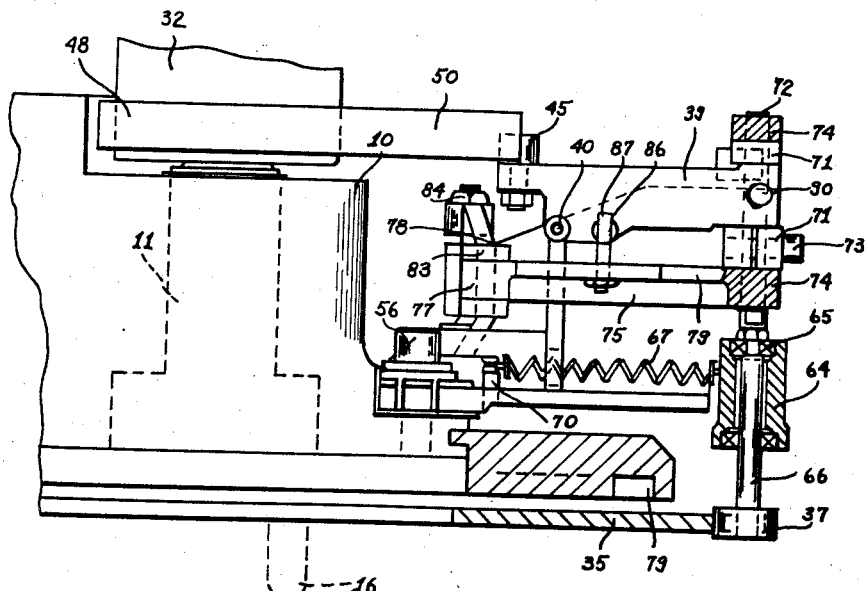
Figure 3 is a sectional view taken along the section line III—III of Figure 2.

As has been indicated in the previous discussion, when a circular pattern of overlapped or spaced spot welds is desired the amount of angular rotation of the spindle 11 should remain constant in order to obtain equally spaced welds around the pattern. In this special case of welding a circular pattern of equally spaced welds the linkage mechanism and camming means may not be needed as the indexing cylinder 25 can be controlled by external fluid valves, not shown, and the spacing by adjusting stops in the cylinder, such as, for example, the adjusting nut 89 at the end of the indexing cylinder. Accordingly, for this special case of operation, I provide means for rendering the indexing apparatus ineffective and to this end the forward end of the actuating arm 39 has an integral boss 90 thereon and the U-shaped fixture 74 of the third arm 75 carries a set screw 91 so that when the actuating arm is pivoted to the broken line position shown in Figure 2 the set screw can be tightened against the boss thereby rendering the indexing apparatus ineffective. As more specifically set forth in the aforementioned patent application the stitch welder also embodies means, not specifically shown, for rendering the cam 19 ineffective and to lock the electrode 14 a certain set distance off-center from the axis of the spindle.

It should thus be apparent that I have accomplished the objects initially set forth. The disclosed indexing apparatus when employed with a stitch welder allows the completion of almost any pattern of welds and the distances between the welds of any given pattern can be made constant or variable in accordance with a predetermined pattern desired by proper selection of the various camming fixtures and surfaces. Obviously, these adjustments provide an extremely versatile machine adapted for almost unlimited usage.

Although I have shown and described an illustrated embodiment of the invention it should be apparent that many changes may be made therein. Therefore reference should be had to the following appended claims in determining the true scope of the invention.

I claim:

1. An electrode-carrying stitch welding assembly for completing overlapped or spaced spot welds comprising a spindle, means to rotate said spindle, an electrode movably mounted on said spindle, means to move said electrode when said spindle is rotated whereby a predetermined pattern of movement of said electrode is obtained, and means to control the spacing between adjacent welds in accordance with a predetermined pattern.

2. An electrode-carrying stitch welding assembly for completing overlapped or spaced spot welds comprising a spindle, an electrode slidably mounted on one end of said spindle, means to intermittently rotate said spindle, means operative to slidably move said electrode when said spindle is intermittently rotated whereby a predetermined pattern of welds is obtained, means to control said means to intermittently rotate, and said means to control comprising means operative in response to the rotative position of said spindle whereby the spacing between adjacent welds may be regulated in accordance with a predetermined pattern.

3. Apparatus according to claim 2 further characterized in that said means to intermittently rotate comprises an over-running clutch having a driven member fixed on said spindle and a driving member mounted for rotation about the principal axis of said spindle and operative to impart rotational movement to said driven member when driven in one direction and to freewheel with respect thereto when rotated in the opposite direction, means to impart reciprocating motion to said driving member, said means to control comprising switch means operative to reverse the actuation of said means to impart reciprocating motion, switch operator means, means connected to said driving member of said over-running clutch for deflecting said switch operating means whereby said switch causes said means to impart reciprocating motion to be reversely actuated, and means to change the relative spacing between said means connected and said switch operating means in accordance with the movement of said spindle.

4. Apparatus according to claim 3 further characterized in that said means connected comprises a camming fixture secured to said driven member of said over-running clutch having a camming surface adapted to engage cam follower means carried by said switch operating means, said means to intermittently rotate comprising a fluid cylinder, stop means positioned in the path of travel of said camming fixture whereby overtravel of said cylinder is prohibited, and said stop means comprising said cam follower means and an accurately contoured stop plate.

5. Apparatus according to claim 3 further characterized in that said means to change comprises a cam plate rotatable with said spindle and having a camming surface of predetermined shape, a cam follower roller adapted to engage said camming surface, means to transmit movement of said cam follower roller to said switch operator means to thereby change said spacing between said means connected and said switch operating means.

6. Apparatus according to claim 5 further characterized in that said means connected comprises a camming fixture secured to said driven member of said over-running clutch, said camming fixture having a camming surface of predetermined contour, and said camming fixture adapted to engage cam follower means mounted on said switch operator means to actuate said switch means.

7. An electrode-carrying stitch welding assembly for completing a pattern of spot welds comprising a spindle, means to intermittently rotate said spindle, an electrode mounted on said spindle, means to control the actuation of said means to intermittently rotate said spindle, and said means to control comprising means operative in response to the rotative position of said spindle whereby the spacing between adjacent welds may be accurately controlled.

8. Apparatus according to claim 7 further characterized in that said means to control comprises cam means having a camming surface of predetermined shape, cam follower means engaging said camming surface, and means for transmitting the movement of said cam follower means for controlling the actuation of said means to intermittently rotate.

9. Apparatus according to claim 7 further characterized in that said means to intermittently rotate comprises power means driving said spindle through an over-running clutch, a camming fixture movable with said power means and having a camming surface of predetermined contour, switch means for reversably actuating said power means, said switch means being operated by said camming fixture, and means to change the relative positions of said camming fixture and said switch means whereby the amount of rotative movement imparted to said spindle may be varied in accordance with a predetermined pattern.

10. Apparatus according to claim 9 further characterized in that said power means comprises a fluid cylinder, and stop means positioned in the path of travel of said camming fixture adapted to prevent overtravel of the piston of said fluid cylinder.

11. Apparatus according to claim 9 further characterized in that said means to change the relative positions comprises cam means having a predetermined camming surface, said cam means being rotatable with said spindle, cam follower means engaging said last mentioned camming surface, and means for transmitting the movement of said cam follower means to said switch means whereby the relative positions of said camming fixture and said switch means are changed in accordance with a predetermined pattern in response to movement of said spindle.

12. An electrode-carrying stitch welding assembly for completing a pattern of spot welds comprising a spindle, means to rotate said spindle, an electrode mounted on said spindle, and means to control the actuation of said means to rotate; said last mentioned means comprising a switch, switch operator means, a camming fixture carried by said means to rotate said spindle and operative to engage said switch operator means, and means to change the relative positions of said switch operator means and said camming fixture whereby said spindle is intermittently rotated in accordance with a predetermined pattern.

13. Apparatus according to claim 12 further characterized in that said means to change the relative position comprises cam means having a predetermined camming surface, cam follower means engaging said camming surface, and means for transmitting the movement of said cam follower means to said switch operator means thereby changing the relative positions of said camming fixture and said switch operator means.

14. Apparatus according to claim 13 further characterized in that said switch operator means comprises a lever pivotally mounted at one end, operating pins intermediate the ends thereof adapted to actuate said switch means, and a cam follower roller mounted on the other end of said lever adapted to be engaged by said camming fixture.

15. Apparatus according to claim 14 further comprising means for rendering said means to control said means to rotate inoperative, said last mentioned means comprising means for retaining said lever in a pivoted position whereby said camming fixture cannot engage said cam follower roller.

16. An electrode carrying stitch welding assembly for completing a pattern of spot welds comprising a spindle journaled in a main housing, an electrode mounted on said spindle, means to rotate said spindle, and means to control the actuation of said means to rotate; said last mentioned means comprising switch means for reversing the actuation of said means to rotate, and means for controlling the actuation of said switch means in accordance with a predetermined pattern in response to the rotative position of said spindle.

17. Apparatus according to claim 16 further characterized in that said means for controlling comprises cam means rotatable with said spindle, cam follower means engaging said cam means, and linkage means for transmitting the movement of said cam follower means.

18. Apparatus according to claim 17 further characterized in that said linkage means comprises a parallel type of linkage having a plurality of arms, each of said arms being pivotally connected to two of the other of said arms, one of said arms being mounted in rigid relation with respect to said main housing, a second of said arms mounting said cam follower means, a third of said arms having a laterally extending mounting platform carrying said switch means, an operating lever pivotally mounted on one end thereof and being normally parallel with said third arm of said plurality of arms, and said operating lever mounting an operating pin intermediate its ends adapted to normally engage said switch means.

19. Apparatus according to claim 18 further characterized in that said operating arm carries cam roller means on the other end thereof, a camming fixture connected with said means to rotate, said camming fixture having a camming surface of predetermined shape, and said camming surface adapted to engage said cam roller means thereby pivoting said operating lever to actuate said switch means.

20. Apparatus according to claim 18 further characterized in that said one end of said operating lever has an integral boss thereon, a U-shaped member having its leg portions disposed above and below said one end of said operating lever, a set screw carried by said U-shaped member, and said set screw adapted to releasably bear against said boss whereby said operating arm may be retained in a pivoted position thereby rendering inoperative said means for controlling.

21. Apparatus according to claim 18 further characterized in that said platform mounts stop means for limiting the movement of said operating lever, and yieldable means urging said operating lever into contact with said stop means.

22. Apparatus for controlling the amount of indexing movement imparted to a driven member by power means comprising switch means for controlling said power means, a camming fixture having a camming surface of predetermined contour coupled with said power means for actuating said switch means, means for changing the relative position of said switch means and said camming surface, and said last mentioned means comprising means operative in response to the position of said driven member.

23. Apparatus according to claim 22 further characterized in that said means for changing comprises cam means movable with said driven member, cam follower means adapted to engage said cam means, and means transmitting the movement of said cam follower means to said switch means.

24. Apparatus according to claim 22 further characterized in that said means for changing comprises cam means, cam follower means adapted to engage said cam means, and means transmitting the relative movement of said cam follower means and said cam means to said switch means.

25. An electrode-carrying stitch welder assembly for completing a pattern of spot welds comprising a spindle, means to intermittently rotate said spindle, an electrode assembly movably mounted on said spindle, cam means for moving said electrode assembly with respect to said spindle in accordance with a predetermined pattern, means to control said means to intermittently rotate said spindle whereby the spacing between the centers of adjacent welds is controlled in accordance with a predetermined pattern, and said means to control comprising second cam means.

26. Apparatus according to claim 25 further characterized in that said first cam means comprises a first cam stationarily mounted with respect to said spindle, first cam follower means carried by said electrode assembly for engaging said first cam, said second cam means comprising a second cam rotatable with said spindle, second cam follower means stationarily mounted with respect to said spindle engaging said second cam, and means for transmitting the movement of said second cam follower to said means to control said means to intermittently rotate.

27. Apparatus of the character described comprising a spindle having a main axis, means to intermittently rotate said spindle, an electrode assembly mounted on one end of said spindle and movable in a plane normal to said axis of said spindle, means to move said electrode assembly in said plane in accordance with a predetermined pattern to vary the off-center distance of said electrode assembly with respect to said axis of said spindle, means to control said means to intermittently rotate in accordance with a predetermined pattern, and said means to move and said means to control being interrelated whereby the spacing between the centers of adjacent welds remains constant.

28. An electrode-carrying stitch welding assembly for completing overlapped or spaced spot welds comprising a spindle, means to intermittently rotate said spindle, an electrode mounted on said spindle, means to control the actuation of said means to intermittently rotate said spindle, and said means to control comprising means operative in response to the rotative position of said electrode whereby the spacing between adjacent welds may be accurately controlled.

References Cited in the file of this patent

UNITED STATES PATENTS

| | | |
|---|---|---|
| Re. 12,273 | McQuawn | Oct. 11, 1904 |
| 2,183,219 | Hollesen | Dec. 12, 1939 |
| 2,234,232 | Chambers | Mar. 11, 1941 |
| 2,673,333 | Seeloff et al. | Mar. 23, 1954 |